(12) United States Patent
Suzuki

(10) Patent No.: US 6,396,657 B1
(45) Date of Patent: May 28, 2002

(54) HAND MECHANISM OF LIBRARY APPARATUS COMPRISING INTEGRATED ROTATABLE PLATE PORTION AND BAR CODE READER

(75) Inventor: Takeshi Suzuki, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/523,666

(22) Filed: Mar. 10, 2000

(30) Foreign Application Priority Data

Mar. 17, 1999  (JP) ............................................ 11-072707

(51) Int. Cl.$^7$ .............................................. G11B 15/68
(52) U.S. Cl. ............................................ 360/92; 369/30
(58) Field of Search ............................................ 360/92

(56) References Cited

U.S. PATENT DOCUMENTS 5,581,522 A  * 12/1996  Sibuya ........................ 360/92
6,064,543 A  *  5/2000  Tatsuda ....................... 360/92

FOREIGN PATENT DOCUMENTS

| JP | 6-52611 | 2/1994 |
|----|---------|--------|
| JP | 6-52657 | 2/1994 |
| JP | 7-210971 | 8/1995 |

* cited by examiner

*Primary Examiner*—A. J. Heinz
(74) *Attorney, Agent, or Firm*—Young & Thompson

(57) ABSTRACT

A library apparatus having a smaller hand mechanism or picker is disclosed, which realizes highly accurate and high-speed identification-data (typically, bar code) reading. The hand mechanism comprises a picker for grasping the cartridge, which is movable along a predetermined path in the frontward and rearward directions so as to proceed towards the storage shelf and move back from the shelf; a plate portion which is rotatable so as to make the plate portion more distant from or closer to the predetermined path of the picker; and a read-out section attached to the plate portion, for reading an identification data provided to the cartridge. When the picker proceeds towards the storage shelf, the plate portion is rotated so as to make the plate portion and the attached read-out section more distant from the predetermined path of the picker.

10 Claims, 4 Drawing Sheets

HAND MECHANISM OF LIBRARY APPARATUS COMPRISING INTEGRATED ROTATABLE PLATE PORTION AND BAR CODE READER

BACKGROUND OF THE INVENTION

1. Field of the Invention

The present invention relates to a hand mechanism of a library apparatus which contains magnetic tape cartridges or the like, and the hand mechanism is used for extracting the cartridge.

This application is based on patent application Ser. No. Hei 11-72707 filed in Japan, the contents of which are incorporated herein by reference.

2. Description of the Related Art

Conventional magnetic tape library apparatuses comprise (i) an ENTRY/EXIT mechanism (i.e., storage shelf) in which a plurality of cells are vertically stacked, and (ii) a hand mechanism for extracting a cartridge stored in one of the cells. When an operator stores a cartridge in the ENTRY/EXIT mechanism, the hand mechanism detects the cartridge and extracts the cartridge from the ENTRY/EXIT mechanism, and transfers it to a predetermined area.

More specifically, a specific bar code is assigned to each cartridge so as to identify the cartridge, and the hand mechanism has a bar code reader. The hand mechanism is positioned so as to make the hand face the bar code of a target cartridge, and the bar code is read by the bar code reader. After the reading operation, the picker of the hand mechanism is moved forward so as to grasp and extract the cartridge and to transfer the cartridge to a predetermined area according to the bar code information.

In order to accurately read the bar code, it is necessary to slide the bar code reader on the scan lines of the bar code; thus, a device for sliding the bar code reader itself or the hand mechanism (to which the bar code reader is attached) is necessary, and the manufacturing cost is higher. In addition, after the bar code is read out by sliding the bar code reader or the hand mechanism, the picker is moved forward so as to grasp the cartridge. Therefore, it is impossible to perform a high-speed operation.

Another type of the hand mechanism has been developed, which has a slip-out preventing mechanism for preventing the grasped cartridge from slipping out from the hand. In this type of hand mechanism, when the cartridge is grasped and drawn in, the slip-out preventing mechanism is rotated so as to open a path where the picker proceeds, and after the cartridge is drawn in, the slip-out preventing mechanism is again rotated so as to shut the above path and to hold the cartridge. In this case, the bar code reader must be provided or attached outside the area where the slip-out preventing mechanism can rotate, so as not to prevent the slip-out preventing mechanism from rotating. Accordingly, the size of the hand mechanism must be relatively large.

SUMMARY OF THE INVENTION

In consideration of the above circumstances, an objective of the present invention is to provide a library apparatus having a smaller hand mechanism and realizing highly accurate and high-speed identification-data (typically, bar code) reading.

Therefore, the present invention provides a hand mechanism of a library apparatus for extracting a cartridge stored in a storage shelf, comprising:

a picker for grasping the cartridge, which is movable along a predetermined path in the frontward and rearward directions so as to proceed towards the storage shelf and move back from the shelf;

a plate portion which is rotatable so as to make the plate portion more distant from or closer to the predetermined path of the picker; and a read-out section attached to the plate portion, for reading out identification data provided to the cartridge, and wherein when the picker proceeds towards the storage shelf, the plate portion is rotated so as to make the plate portion, and the attached read-out section more distant from the predetermined path of the picker.

According to the above hand mechanism, the read-out section and the plate portion are integrally provided; thus, the read-out section is also rotated according to the rotation of the plate portion. Therefore, the rotation of the plate portion is not limited by the read-out section, and it is unnecessary to provide or arrange the read-out section outside the rotatable area of the plate portion. Accordingly, a smaller hand mechanism can be realized.

Preferably, when the picker proceeds towards the storage shelf, the plate portion is rotated upward. In a typical example, when the picker proceeds towards the storage shelf, the picker pushes up the plate portion and the attached read-out section.

In particular, if the read-out section is a bar code reader, when the bar code reader rotates together with the plate portion, the scanning beam can slide without sliding the bar code reader itself. Therefore, a mechanism for sliding the bar code reader is unnecessary, and the target bar code can be accurately read out with high speed.

DESCRIPTION OF THE PREFERRED EMBODIMENTS

Hereinafter, an embodiment according to the present invention will be explained in detail with reference to the drawings.

Figure 1:
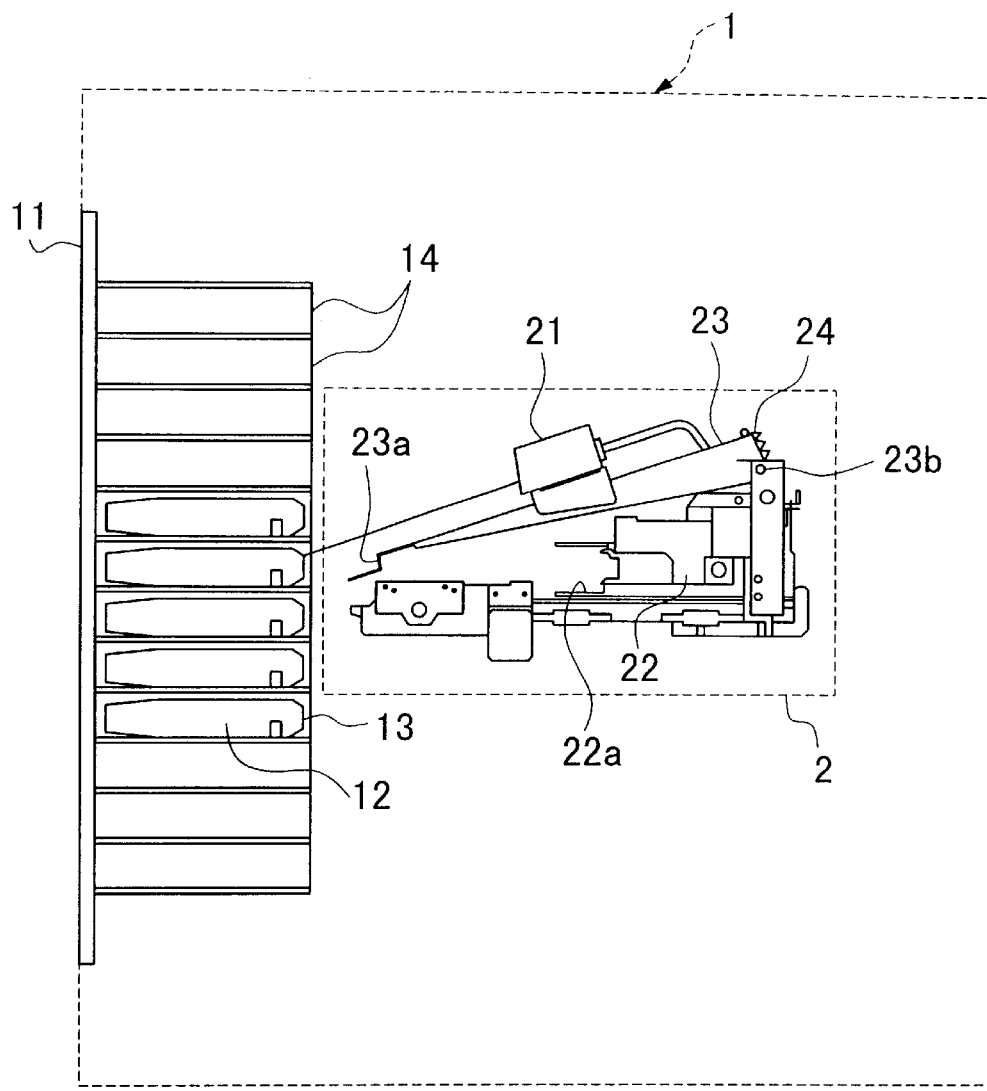
FIG. 1 is a diagram showing the structure of the magnetic tape library apparatus using the hand mechanism as an embodiment according to the present invention.
Figure 2:
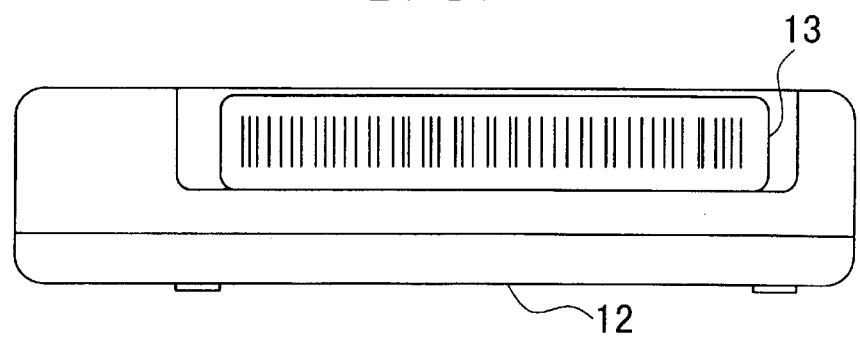
FIG. 2 is a front view of a magnetic tape cartridge used in the above magnetic tape library apparatus.

As shown in FIG. 1, a plurality of cells 14 are attached to an ENTRY/EXIT mechanism 11 in a magnetic tape library apparatus 1. A cartridge 12 can be stored in each cell 14, and the front face of the cell 14 is open so as to extract or insert the cartridge 12. As shown in FIG. 2, a seal on which a bar code (i.e., identification data) 13 is printed is put on the front face of the cartridge 12. The bar code 13 includes information on the title (i.e., identification sign) indicating the contents of cartridge 12.

Also as shown in FIG. 1, hand mechanism 2 for transferring the cartridge 12 comprises picker 22 for extracting/inserting cartridge 12 from/into target cell 14, and a plate portion 23 arranged so as to cover the picker 22. A holding portion 23a for holding the cartridge 12 inside the hand mechanism 2 is provided at the top end of the plate portion 23. Therefore, the holding portion 23a prevents the cartridge 12 inside the hand mechanism 2 from slipping out. The picker 22 has a grasp portion 22a for grasping the cartridge 12 at the top end of the picker.

While the picker 22 is positioned rearward, the plate portion 23 is forced by spring 24 (provided at the base-end side of the portion 23) so as to maintain an inclined position in a manner such that the top-end side thereof is lower as shown in FIG. 1. When the picker 22 proceeds to the ENTRY/EXIT mechanism 11 side, the picker 22 pushes up the plate portion 23 against the elastic force of spring 24, so that the plate 23 rotates around the fulcrum 23b. When the picker 22 is moved rearward, the plate portion 23 again inclines downward (as shown in FIG. 1) due to spring 24.

In addition, bar code reader 21 for reading out the bar code 13 printed on the cartridge 12 is attached on the surface of plate portion 23. The bar code reader 21 radiates a scanning beam parallel to the plate portion 23. Therefore, when the plate portion 23 is inclined downward, the bar code reader 21 also radiates a scanning beam in the corresponding downward slanting direction.

The operation of the hand mechanism of the present embodiment will be explained with reference to FIGS. 1, 3, and 4.

When an operator stores cartridge 12 in a cell 14 of the magnetic tape library apparatus 1, the hand mechanism 2 is moved so as to position picker 22 in front of the target cartridge 12.

The bar code 13 on the target cartridge 12 is read by the bar code reader 21. As explained above, the plate portion 23 is inclined downward; thus, the scanning beam is also radiated towards the corresponding downward slanting direction from the bar code reader 21, so that the cartridge 12 facing the picker 22 is irradiated by the scanning beam.

Figure 3:
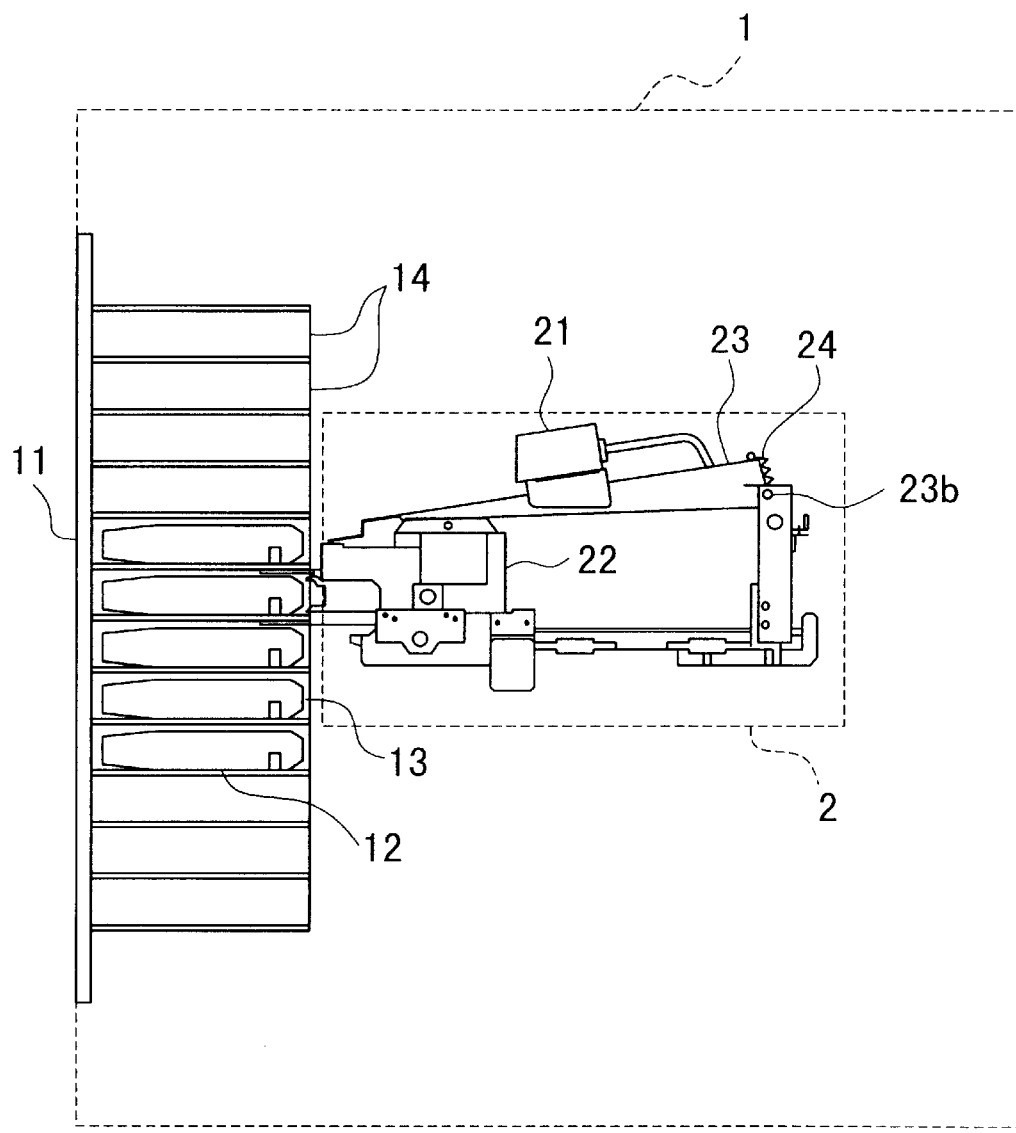
FIG. 3 is a diagram showing an operation state when the library apparatus is driven.

In the next step, picker 22 proceeds to the cell 14 side, as shown in FIG. 3. In this step, the picker 22 pushes up the plate portion 23 and bar code reader 21 against the elastic force of spring 24. The picker 22 then grasps the cartridge 12 by using the grasp portion 12a provided at the top end thereof, and then moves rearward.

Figure 4:
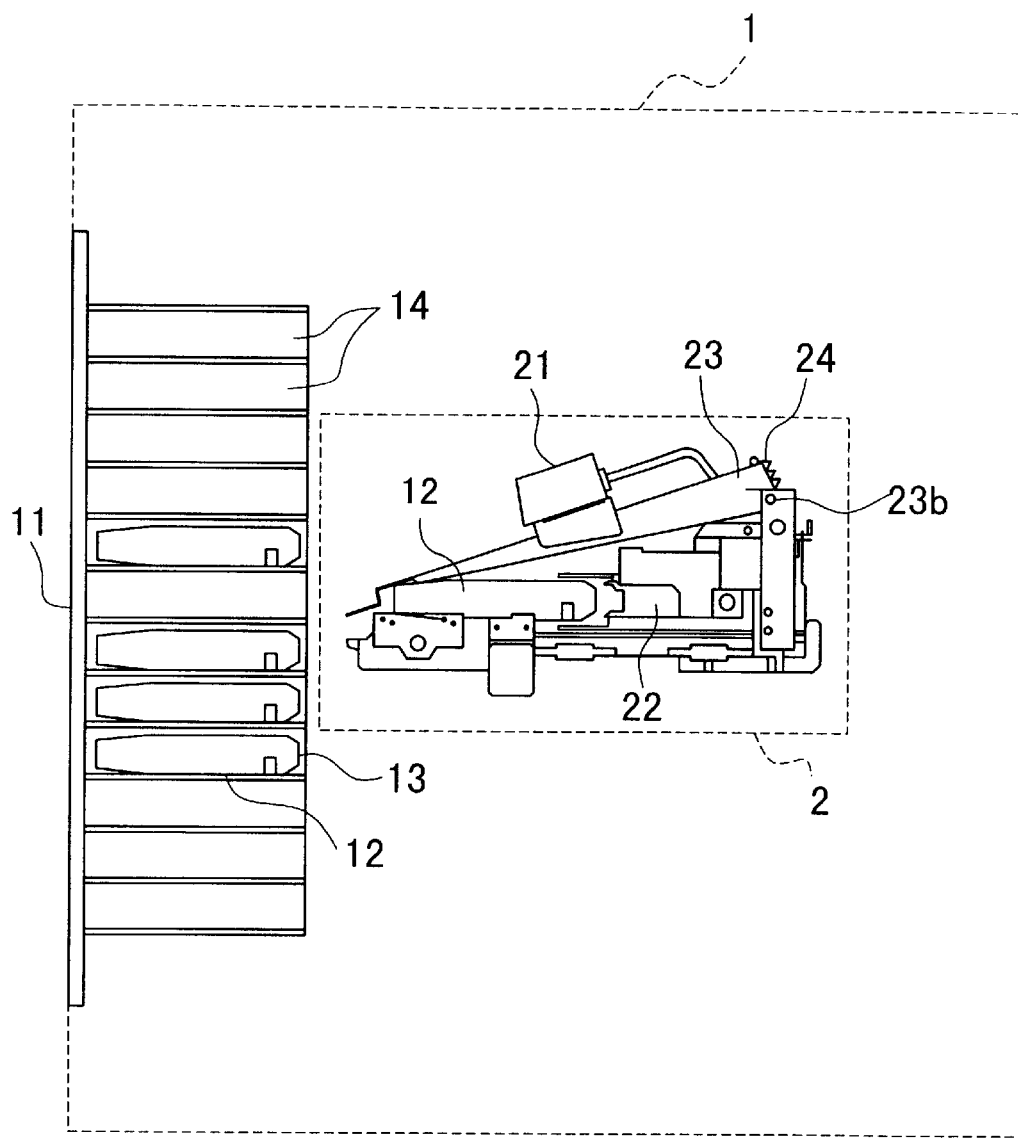
FIG. 4 is a diagram showing an operation state when the library apparatus is driven.

As shown in FIG. 4, when the picker 22 is moved rearward, the target cartridge 12 is drawn into the hand mechanism 2, and the plate portion 23 and bar code reader 21 are again hung down (i.e., inclined downward) due to the elastic force of the spring 24. Here, the holding portion 23a at the top end of plate portion 23 covers the front face of cartridge 12. Therefore, even if the cartridge becomes detached from the grasp portion 22a, the cartridge does not slip or fall from the hand mechanism 1.

The cartridge 12 is transferred to a predetermined area based on the information corresponding to the bar code read out by the bar code reader 21.

As explained above, in the hand mechanism of the present embodiment, the bar code reader 21 and plate portion 23 are integrally provided or arranged; thus, a smaller hand mechanism can be realized.

Figure 5:
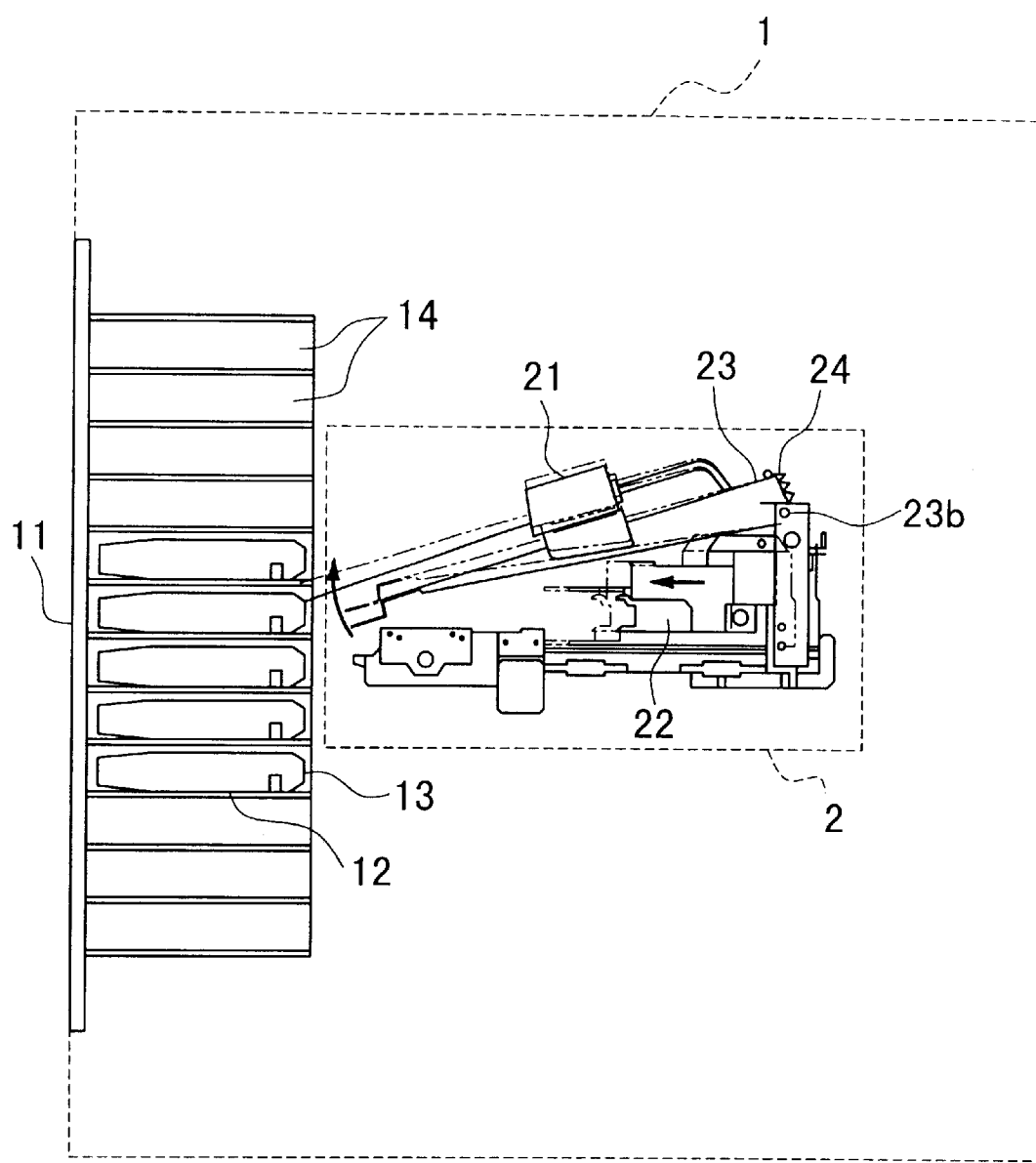
FIG. 5 is a diagram showing an operation state when the bar code is read out in the library apparatus.

Generally, in order to accurately read out a bar code, the scan lines should be shifted. As described above, in the hand mechanism of the present embodiment, when the picker 22 proceeds forward, the picker pushes up the plate portion 23 and bar code reader 21. Therefore, as shown in FIG. 5, when the picker proceeds slightly while the bar code reader reads out bar code 13, the bar code reader 21 also shifts and as a result, an effect similar to that obtained by sliding the scan lines can be obtained. That is, the scan lines slide without moving the bar code reader 21 itself; thus, a mechanism for moving the bar code reader itself is unnecessary. Therefore, the bar code can be accurately read out with high speed.

What is claimed is:

1. A hand mechanism of a library apparatus for extracting a cartridge stored in a storage shelf, comprising:
    a picker for grasping the cartridge, the picker being movable along a predetermined path towards the storage shelf and back from the shelf;
    a plate portion rotatably connected to the picker; and
    a read-out section attached to the plate portion, for reading out identification data provided on the cartridge, and
    wherein the hand mechanism is arranged so that movement of the picker towards the storage shelf causes the plate portion and the attached read-out section to rotate.

2. A hand mechanism as claimed in claim 1, wherein the hand mechanism is arranged so that movement of the picker towards the storage shelf causes the plate portion to rotate upward.

3. A hand mechanism as claimed in claim 2, wherein the hand mechanism is arranged so that movement of the picker towards the storage shelf causes the picker to push up the plate portion and the attached read-out section.

4. A hand mechanism as claimed in claim 1, wherein the read-out section is a bar code reader.

5. The hand mechanism of claim 1, wherein the hand mechanism is arranged with respect to the storage shelf so that the rotation of the plate portion caused by the movement of the picker causes the read-out section attached to the plate portion to scan across the identification data provided on the cartridge.

6. The hand mechanism of claim 1, wherein the hand mechanism is arranged with respect to the storage shelf so that the read-out section is positioned to read out the identification data from the cartridge without the cartridge being positioned within the grasp of the picker.

7. The hand mechanism of claim 5, wherein the hand mechanism is arranged with respect to the storage shelf so that the read-out section is positioned to read out the identification data from the cartridge without the cartridge being positioned within the grasp of the picker.

8. The hand mechanism of claim 1, wherein the plate portion comprises a holding portion positioned and shaped so that when the cartridge is positioned within the grasp of the picker, the holding portion prevents the cartridge from slipping out from the picker.

9. The hand mechanism of claim 8, wherein the holding portion is arranged at an end of the plate portion nearest the storage shelf.

10. The hand mechanism of claim 1, further comprising an elastic force element connected to the plate portion and urging the plate portion into a first position, wherein movement of the picker toward the storage shelf causes the plate portion to move against the elastic force element toward a second position.

* * * * *